United States Patent [19]

Auiler et al.

[11] 4,094,275
[45] June 13, 1978

[54] VAPORIZED LIQUID FUEL DELIVERY AND METERING SYSTEM

[75] Inventors: James E. Auiler, Ann Arbor; Douglas R. Hamburg, Birmingham; James E. Hyland, Trenton; David F. Moyer, Ann Arbor, all of Mich.

[73] Assignee: Ford Motor Company, Dearborn, Mich.

[21] Appl. No.: 660,281

[22] Filed: Feb. 23, 1976

[51] Int. Cl.² .......................................... F02M 31/08
[52] U.S. Cl. ............................. 123/34 A; 123/122 E; 123/133
[58] Field of Search ...................... 123/35, 34 R, 34 A, 123/133, 122 E, 122 F

[56] References Cited

U.S. PATENT DOCUMENTS

| | | | |
|---|---|---|---|
| 3,738,334 | 6/1973 | Farr | 123/34 A |
| 3,765,382 | 10/1973 | Vandenberg | 123/34 A |
| 3,948,229 | 4/1976 | Knapp et al. | 123/122 E |

*Primary Examiner*—Samuel Feinberg
*Attorney, Agent, or Firm*—Robert A. Benziger; Keith L. Zerschling

[57] ABSTRACT

A fuel delivery system for an internal combustion engine is disclosed. The system includes primary and auxiliary heating means for vaporizing a liquid fuel, vapor storage means, carburetor means including metering venturi means for mixing the vaporized liquid fuel with atmospheric air to provide a combustible air/fuel mixture and means for controlling the delivery of vaporized fuel to the carburetor means. The carburetor means may be connected to a conventional internal combustion engine intake manifold for eventual delivery of the combustible mixture to the combustion chambers of the engine. The vaporized liquid fuel delivery means of the system includes a variable orifice vapor delivery nozzle for modulating the vaporized fuel content of the air/fuel ratio of the combustion mixture.

The auxiliary heating means are operative to provide an initial supply of vapor to a vapor reservoir upon startup of the internal combustion engine. Normal vaporization is provided by the primary heating means which include a vapor producing heat exchanger situated within the exhaust gas stream of the internal combustion engine to utilize waste heat from the exhaust gases to produce normal running vapor. The vapor so formed is stored in the vapor reservoir and is delivered under vapor pressure pressurization to the vapor delivery nozzle. The vapor reservoir includes a condensed fuel collection and return passage to return condensed liquid fuel to a fluid reservoir. The heating means are serially communicated to a source of liquid fuel through a coarse metering valve. The quantity of vapor within the reservoir is controlled by electrically sensing the amount of vapor within the reservoir and by electrically controlling the coarse metering valve to maintain a desired level of vapor within the reservoir. Liquid fuel is drawn from a conventional fluid reservoir such as a vehicle fuel tank and is heated to cause vaporization.

The carburetor means is provided with a swirl inducing section arranged to be noncontactive with the vapor stream for promoting turbulent mixing of the vapor stream with ingested air at a point downstream from the swirl inducing means. The swirl so induced inhibits direct contact of the vaporized liquid fuel with the intake manifold prior to mixing. An electrical control system responsive to a variable resistance exhaust gas partial pressure of oxygen sensor is arranged to control the vapor fuel delivery nozzle through servo mechanism control of the variable orifice of the vapor delivery nozzle.

12 Claims, 9 Drawing Figures

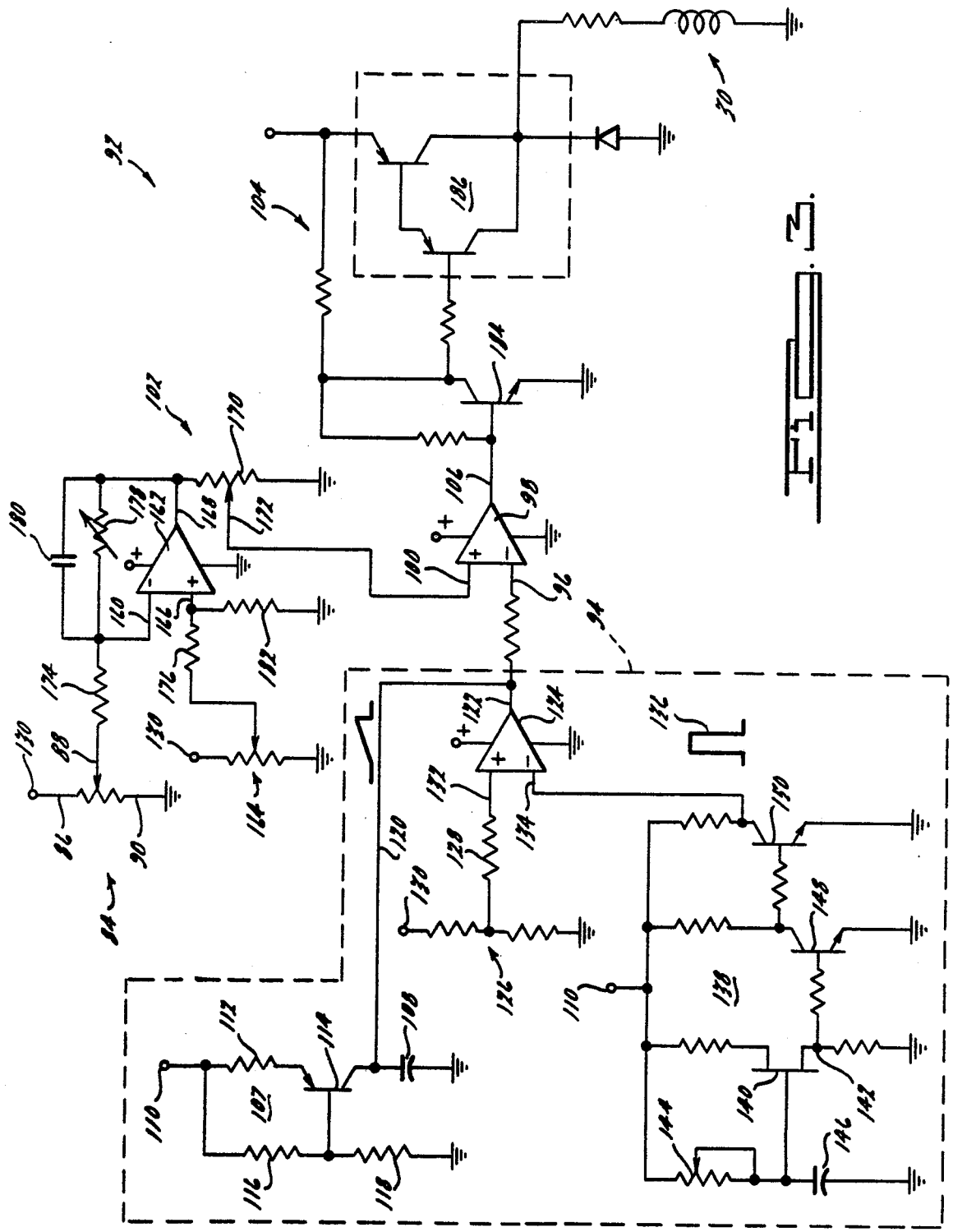

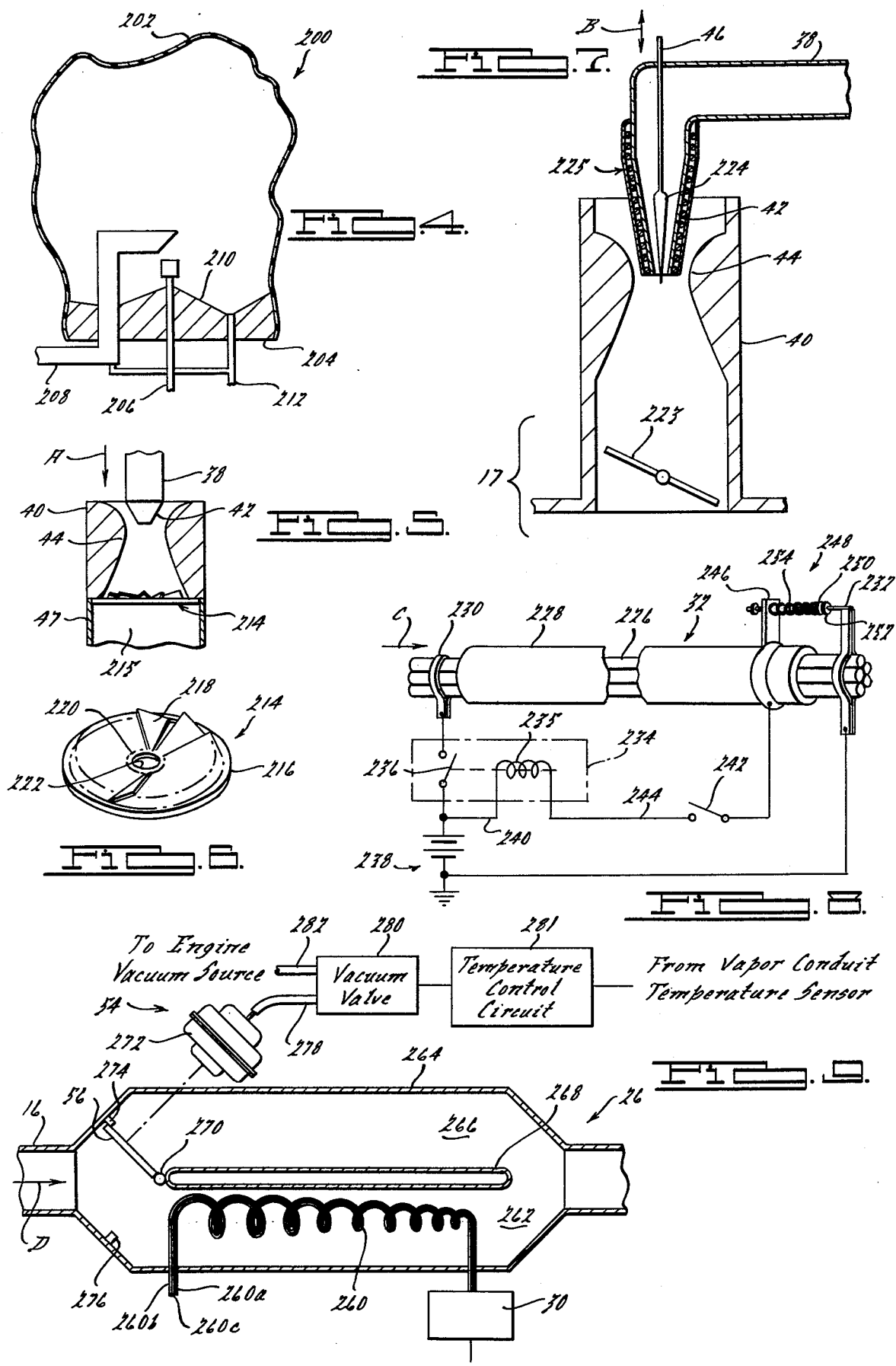

VAPORIZED LIQUID FUEL DELIVERY AND METERING SYSTEM

BACKGROUND OF THE INVENTION

1. Field of the Invention

The present invention is directed to the field of fuel supply systems for engines. More particularly still, the present invention is directed to that portion of the above-noted field which is concerned with the provision of a combustible air/fuel mixture to an internal combustion engine. More particularly still, the present invention is directed to that portion of the above-noted field which is concerned with the provision of a fuel system including means for vaporizing a liquid fuel to form a fuel vapor which may be mixed thereafter with atmospheric air to generate a combustible air/fuel mixture. More particularly still, the present invention is directed to that portion of the above-noted field which is concerned with the provision of a combustible air/fuel mixture having a substantially constant air/fuel ratio and which minimizes the tendency of fuel vapor to condense or collect prior to entry of the combustible mixture into the combustion chambers of the engine.

2. Description of the Prior Art

The internal combustion engine most frequently encountered in current technology is powered by a liquid fuel which is introduced into the combustion chambers of the engine in conjunction with a quantity of atmospheric air. This mixture is subsequently ignited by compression or by an electrical spark. The quantity of fuel introduced into the engine is coarsely calculated to provide a combustible mixture for each engine combustion chamber and to provide, upon combustion, sufficient energy to achieve a desired operating characteristic for the engine. While the air/fuel ratio of the total combustible mixture may be relatively closely controlled, it is known that cylinder-to-cylinder variations in the air/fuel mixture can be significant.

The most frequently encountered air and fuel delivery systems for internal combustion engines involve the metering of a quantity of liquid fuel for mixture with an air stream to form, upstream of the combustion chambers of the engine, a combustible mixture of air and fuel. The most commonly encountered system allows liquid fuel to be delivered under a pressure differential directly to an air stream substantially upstream from the combustion chambers. Turbulence in the air stream is allowed to accomplish mixing. A variety of schemes have been suggested in the prior art to provide uniform distribution of the mass of fuel throughout the mass of air. For example, the prior art shows a variety of techniques to "atomize" or otherwise finely divide the liquid fuel droplets.

As an alternate to delivery of the liquid fuel upstream from the combustion chambers, it is not uncommon for a quantity of liquid fuel to be delivered directly to the combustion chamber with the amount of fuel being calculated to provide approximately stoichiometric combustion with the quantity of air ingested by the engine under the then-existing operating conditions of the engine. The more recently introduced electronic fuel injection provides quantities of fuel in proximity to, but upstream from, the intake port of the combustion chamber for ingestion by the combustion chamber with a quantity of air provided in the intake manifold. A less common technique is to deliver a quantity of liquid fuel into the combustion chamber and to allow turbulence and heat therein to mix the fuel with the ingested air.

As thus described, virtually all air and fuel metering and mixing systems for internal combustion engines rely on mixing a measured quantity of fuel, in liquid form and typically a petroleum product such as gasoline or diesel fuel oil, with a quantity of atmospheric air in gaseous form for introduction into the combustion chambers of the engine. It has long been understood that the quantity of fuel be approximately uniformly distributed throughout the air mass in order to promote good combustion. In order to achieve this result, a large number of schemes have been recommended in the prior art to atomize or otherwise finely divide and distribute the liquid fuel within the air stream. However, as will be appreciated, the uniform distribution of a large number of droplets of liquid within an air stream is virtually impossible. For example, the walls of the intake manifold tend to accumulate liquid droplets (become wet) and the quantity of fuel so attached to the manifold walls may vary. A further problem results from the different mixture flow paths between the point of mixing of the air/fuel mixture and the different combustion chambers. As a result of the above-noted facts (1) a transient time delay may occur before changes in the rate of fuel delivery to the air stream may produce a change in the rate of fuel delivery to the combustion chambers as fuel is accumulated, or given up, by the manifold walls and (2) cylinder-to-cylinder air/fuel ratios may vary significantly as the relatively heavy liquid fuel droplets are nonuniformly distributed at mixture flow junctions.

It has been proposed that uniform distribution of a quantity of liquid fuel within a moving air stream may be achieved by converting the quantity of liquid fuel into a vapor, as by heating. It is therefore one object of the present invention to provide a fuel delivery and metering system for use with an internal combustion engine which system is capable of providing the engine with a combustible mixture having vaporized liquid fuel. In order to avoid needless complexity, it is a further object of the present invention to provide such a fuel delivery and metering system which vaporizes the liquid fuel prior to the mixing of the fuel with air. It is a still further object of the present invention to provide such a system which includes means for metering a vaporized liquid fuel.

In providing such a fuel delivery and metering system, a variety of problems are encountered. For example, commercially available gasoline is normally completely vaporized, at atmospheric pressure, at temperatures of about 425° F. In order to maintain the fuel in vapor form prior to metering and mixing, it is necessary to minimize the contact between such vaporized fuel and any surfaces which could promote condensation. However, once the vaporized fuel is mixed with air for delivery to the engine, some contact with lower temperature engine components can be anticipated. It is therefore an object of the present invention to provide such a system which inhibits the contact of the vaporized liquid fuel with any structural component surfaces which could promote condensation.

The use of a vaporized liquid fuel for mixture with atmospheric air to provide a combustible air/fuel ratio has previously been proposed. However, the prior proposals for providing such a fuel delivery and metering system have usually incorporated additional structure which, in turn, has generated substantial technical problems particularly in application of such a system to an automotive internal combustion engine. For example, it has been proposed that the liquid fuel be vaporized by situating an electrical heater within an otherwise conventional liquid fuel delivery conduit without otherwise adjusting for the volume change in vaporization of liquid fuel. Such systems have suggested metering based on liquid fuel delivery. In such a system, the air/fuel ratio of the combustible mixture so produced may be expected to vary (1) as a function of fuel delivery through the conduit upstream from the heater means, (2) as a function of atmospheric pressure, (3) as a function of the flow rate of air within the air delivery conduit, (4) as a function of the composition of the liquid fuel and (5) as a function of the long term performance of the metering apparatus.

Other suggestions for using a vaporized liquid fuel have included the provision of liquid fuel to a carburetor or other metering device for various phases of engine operation. Such systems are, of course, unsatisfactory in that the problems attendant to liquid fuel systems generally will occur during those modes of engine operation where fuel delivery in the liquid state is necessary. It is therefore a specific object of the present invention to provide a vaporized liquid fuel delivery system which operates with a liquid fuel in vapor form for steady state and transient operation of the associated internal combustion engine. More particularly still, it is a specific object of the present invention to provide such a fuel delivery and metering system which will deliver vaporized liquid fuel during, and will accommodate, all modes of engine operation particularly when that engine is intended to power a motor vehicle. With the foregoing objective in mind, it is a further and particular objective of the present invention to provide a fuel delivery and metering system adapted to use a vaporized liquid fuel which system substantially reduces the likelihood of vaporized liquid fuel from condensing under circumstances tending to permit liquid fuel to enter the intake system of an associated engine. It is a further and particular object of the present invention to provide such a fuel delivery and metering system which avoids the accumulation of relatively nonvolatile heavy fuel fractions under conditions which would tend to prevent an adequate supply of vaporized liquid fuel for normal engine operation.

In designing a fuel delivery and metering system to accomplish the foregoing objectives, it is necessary to consider a variety of technical problems. In powering a motor vehicle, an internal combustion engine will typically consume an air mass under maximum consumption operating conditions which is approximately (20) times the mass of air consumed by the engine during its minimum consumption operating conditions. In order to provide for a substantially constant air/fuel ratio over the entire range of engine operation, it is necessary that the fuel delivery and metering system be capable of providing quantities of fuel which may range over a ratio of mass flow rates of (20:1). Thus, in designing the fuel delivery portion of a vaporized liquid fuel delivery and metering system it is necessary to be able to vaporize a mass flow rate of fuel at maximum engine operating conditions which will be (20) times the mass flow rate of fuel necessary for minimum operating conditions of the engine. While it is possible to achieve this ratio of vaporization of a mass flow rate of liquid fuel by modulating the flow through a conduit which includes a vaporizing means, it will be appreciated that such an approach, in order to provide a substantially constant air/fuel ratio, would require sophisticated techniques of measuring air flow and sophisticated techniques of monitoring and modulating the flow of the liquid fuel into the vaporizing means. It is therefore a specific object of the present invention to provide a vaporized liquid fuel delivery and metering system which is capable of vaporizing quantities of fuel commensurate with maximum engine operation and which may readily provide quantities of vaporized fuel consistent with minimum engine operation. It is a still further object of the present invention to provide such a system which bases fuel metering on metering of the vaporized liquid fuel.

The prior art has also suggested that the vaporized liquid fuel be provided to the air stream under superatmospheric pressure as, for example, by a positive displacement pump. Such systems would have pressure being varied to accomplish variation in fuel delivery rates. In view of the wide variety of atmospheric conditions under which a motor vehicle having an internal combustion engine is intended to operate, such a system requires means to compensate the vaporized fuel pressure in view of existing atmospheric pressure. This adds unnecessary cost and complexity to any kind of fuel system. It is therefore an object of the present invention to provide a vaporized liquid fuel delivery and metering system which does not rely on pressures in excess of atmospheric pressure to deliver and meter the fuel to the air stream. It is therefore a further object of the present invention to provide a vaporized liquid fuel delivery and metering system which may maintain a substantially constant air/fuel ratio by automatically compensating fuel pressure for atmospheric pressure variations without the addition of pressure sensing devices or of pump modulation or control devices. More particularly still, it is an object of the present invention to provide such a system in which the vaporized liquid fuel is maintained at substantially atmospheric pressure. More particularly still, it is an object of the present invention to provide a vaporized liquid fuel delivery and metering system in which vaporized liquid fuel is delivered to the air stream for mixture therewith at a vapor pressure upstream from the vapor delivery nozzle which is substantially equal to the pressure of the air source immediately upstream from the engine air intake under substantially all engine operating conditions. It is a specific object of the present invention to provide a vaporized liquid fuel delivery and metering system which meters vaporized liquid fuel to an air stream to establish an accurately controlled and maintained air/fuel ratio over a wide range of mass flow rates. It is a still further and particular object of the present invention to provide a fuel delivery and metering system for delivery of a vaporized liquid fuel to an air stream to form a combustible air/fuel mixture having a substantially constant air-to-fuel ratio for mass air flows which may vary rapidly by a factor of (20:1). It is a further object of the present invention to provide a mechanism for modulating the quantity of vaporized liquid fuel delivered by such a system. More particularly still, it is a further and specific object of the present invention to provide a vaporized liquid fuel delivery and metering system which may be made responsive to changes in the partial pressure of oxygen in the combustion by-products produced by the combustible mixture for maintaining the combustible mixture at a substantially constant air/fuel ratio.

SUMMARY OF THE PRESENT INVENTION

The present invention provides a vaporized liquid fuel metering and delivery system adapted for use in conjunction with an internal combustion engine for powering an automotive vehicle. The system utilizes a substantially conventional liquid fuel tank or reservoir and delivers a combustible mixture including a vaporized liquid fuel to a substantially conventional air intake manifold of an otherwise substantially conventional internal combustion engine. The system extracts liquid fuel from the fuel tank and supplies the fuel to an intermediate fluid reservoir. The liquid fuel is extracted from the intermediate fluid reservoir and is caused to pass through primary and auxiliary heating means in order to elevate the temperature of the liquid fuel to form a vapor. The vapor so formed is stored in a vapor reservoir having a movable wall portion. The movable wall portion is preferably referenced to the pressure immediately upstream from the inlet to the fuel metering portion of the air intake manifold system.

The interior of the vapor reservoir is communicated to a vapor delivery nozzle which is situated within the low pressure zone of an air intake venturi. The diameter of the vapor delivery nozzle is sized with respect to the diameter of the venturi throat, at the point where the vapor delivery nozzle is situated within the venturi throat, to provide a ratio of cross-sectional areas which will automatically provide approximately the desired air-to-fuel ratio of the combustible mixture. A movable pintle and needle valve is situated within the vapor delivery nozzle for accurately controlling the precise area of the vapor delivery nozzle orifice for controlling the air-to-fuel ratio of the combustible mixture so formed. Means are provided within the venturi throat, downstream from the vapor delivery nozzle, for inducing swirl of the air stream as it enters the intake manifold. These swirl inducing means are sized situated and spaced so as to be out of contact with the vapor stream delivered by the vapor delivery nozzle.

The primary and auxiliary heating means are provided with a source, for example by serial flow, of liquid fuel from an intermediate or holding tank or fluid reservoir. The heating means are in fluid communication with the vapor reservoir. The heating means are cooperative to vaporize liquid fuel to charge the vapor reservoir. The primary heating means include a heat exchanger coil of tubing communicating with the intermediate reservoir and situated within the exhaust gas passage of the internal combustion engine. The heat exchanger coil is sized to have a surface area and flow passage diameter sufficient to fully vaporize quantities of liquid fuel capable of sustaining engine operation under maximum fuel consumption conditions. The auxiliary heating means are comprised of an electric heater apparatus which may be energized in conjunction with start-up of the associated engine to provide an initial charge of vapor for starting of the engine and for operation of the engine until the temperature of the primary heating means heat exchanger apparatus may be sufficiently elevated so that it may be the principal source of liquid fuel vaporization.

The intermediate fluid reservoir is arranged to be in fluid communication with the vapor reservoir to receive any condensed vapors for subsequent revaporization in order to avoid any contamination of the main liquid fuel tank or reservoir. Electrical means responsive to the quantity of vapor within the vapor reservoir are provided to control the delivery of liquid fuel from the intermediate reservoir to the heating means. This assures an adequate supply of vapor in the vapor reservoir for normal engine operation without excess vapor being generated under low fuel consumption conditions.

Since the primary heating means are situated within the normally provided internal combustion engine exhaust gas passage and may therefore be expected to be capable of achieving temperatures substantially in excess of that necessary for vaporization of a liquid fuel, a temperature controlled exhaust gas flow diverter valve may control the delivery of heated exhaust gases to the heat exchanger means. The diverter valve may be made responsive to the temperature of the vapor within the vapor reservoir or at any other preselected location such as the vapor delivery conduit.

In order to correct for long term variations in the air-to-fuel ratio of the combustible mixture, the system also provides an exhaust gas sensor situated within the exhaust system of the internal combustion engine. The exhaust gas sensor is arranged to control a servomechanism to variably position the pintle and needle valve within the vapor delivery nozzle.

BRIEF DESCRIPTION OF THE DRAWING

FIG. 3 illustrates the electrical control circuit for maintaining a desired vapor volume in the vapor reservoir.

FIG. 4 illustrates an alternative embodiment for the vapor reservoir according to FIG. 2.

FIG. 5 illustrates an enlarged sectional view of the air and fuel delivery and metering venturi of the carburetor means and the associated swirl-inducing means according to FIG. 1.

FIG. 6 illustrates the swirl-inducing means according to FIG. 5 in a perspective view.

FIG. 7 is an enlarged sectional view of the fuel delivery nozzle, trim pintle, metering venturi and throttle, with swirl-inducing means not shown, illustrative of vaporized liquid fuel metering.

FIG. 8 is a diagrammatic view illustrating the auxiliary heating means according to FIG. 1.

FIG. 9 is an enlarged, partly diagrammatic, partly sectional view of the primary heat exchanger means according to FIG. 1 in association with the heat exchanger temperature control means.

DESCRIPTION OF THE PREFERRED EMBODIMENT

Figure 1:
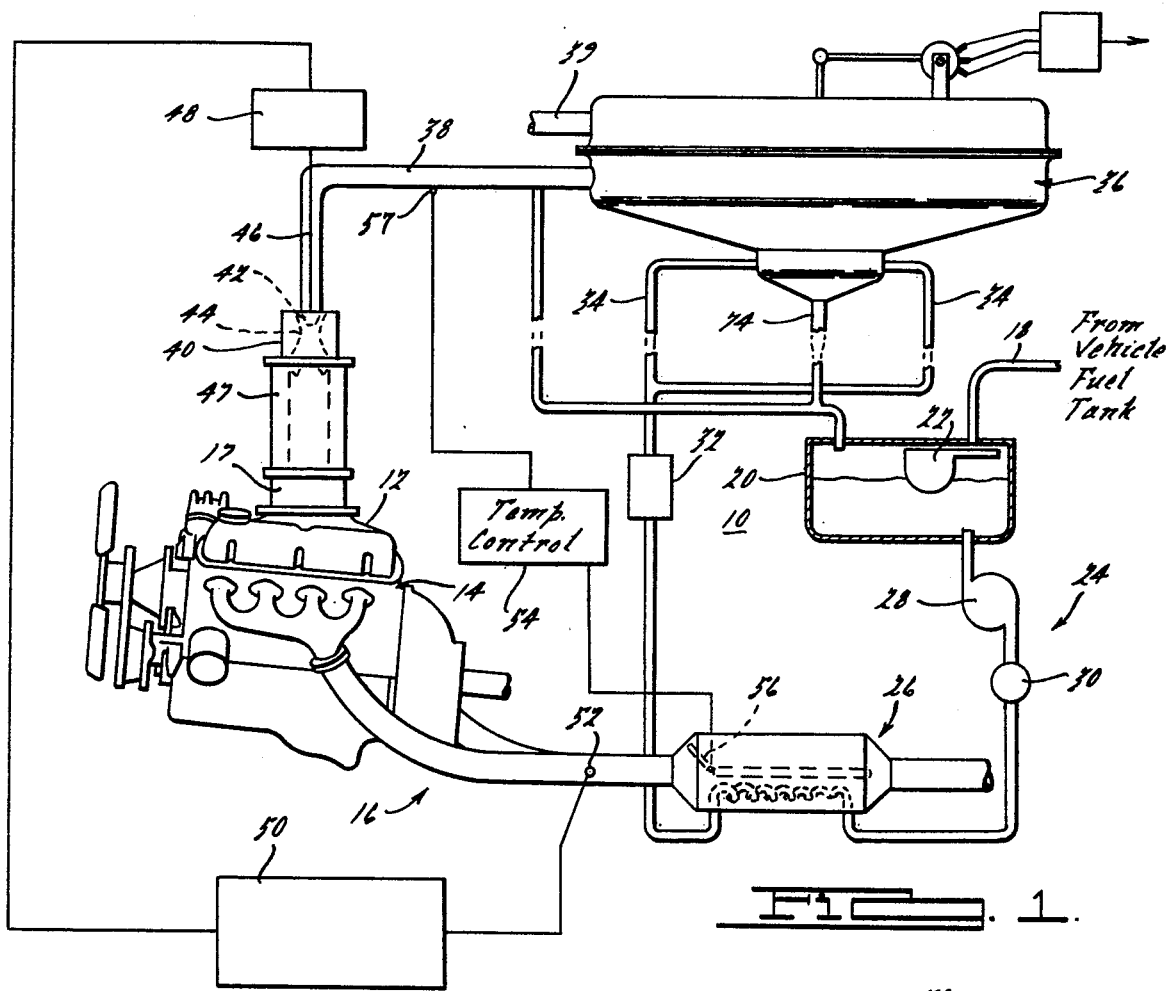
FIG. 1 illustrates the vaporized liquid fuel delivery and metering system according to the present invention, in association within an automotive internal combustion engine, in a diagrammatic view.

Referring now to the drawing wherein like numerals designate like structure throughout the various views thereof, FIG. 1 illustrates the vaporized liquid fuel delivery and metering system 10 according to the present invention. The vaporized liquid fuel delivery and metering system 10 is arranged to provide a combustible mixture to the intake manifold 12 of an internal combustion engine 14. Internal combustion engine 14 is provided with combustion by-product exhaust gas conduit means 16. Intake manifold 12 is provided with throttle body 17. As illustrated, internal combustion engine 14, intake manifold 12, throttle body 17 and exhaust gas conduit means 16 are substantially conventional. For purposes of illustration, it will be considered that internal combustion engine 14 is of the type adapted for installation and use in powering an automotive vehicle, not shown.

System 10 is arranged to receive liquid fuel from a conventional liquid fuel reservoir or tank, not shown, through conduit 18. Conduit 18 communicates with intermediate liquid fuel reservoir 20. The communication between conduit 18 and intermediate reservoir 20 may be controlled, for example, by a pivoted float valve 22 in the conventional manner. As will be appreciated, liquid fuel could be pumped through conduit 18 by conventional pumping means such as the conventional mechanical or electrical fuel pump normally used in automotive vehicles.

Liquid fuel contained in intermediate reservoir 20 may be provided by coarse pumping and valving means 24 to primary heating means 26. Coarse pumping and valving means 24 may include for example, an electrical or mechanical liquid pump 28 and a liquid control valve 30. This structure is described in somewhat greater detail hereinbelow with reference to FIG. 3. An auxiliary heating means 32 is arranged in fluid serial flow relationship with respect to the primary heating means 26 so that fuel provided from intermediate reservoir 20 would flow serially through the primary heating means 26 and thence through auxiliary heating means 32. The auxiliary heating means 32 are shown to be communicated via conduits 34 to vapor reservoir 36. Vapor reservoir 36 is described in greater detail hereinbelow with reference to FIG. 2.

As illustrated in FIG. 1, the primary and auxiliary heating means 26, 32 are connected in serial fluid flow relationship. In order for efficient operation of the auxiliary heating means 32, it should be designed for relatively low fuel flow consonant with operation of the associated engine at idle. As such, however, the auxiliary heating means could present a high impedance to fluid flow and could impede engine operation under high fuel consumption conditions. It is therefore contemplated that the primary and auxiliary heating means could be connected in parallel fluid flow. It is also contemplated to provide a fluid by-pass valve downstream from primary heating means 26 and upstream from the auxiliary heating means 32 to place the primary heating means 26 in direct fluid communication with the vapor reservoir 36 when the auxiliary heating means 32 are not required as a vapor supply source.

Vapor reservoir 36 is communicated by way of conduit 38 with carburetor means 40. As used herein "carburetor" means any device for mixing fuel with air to establish a combustible air/fuel mixture. As illustrated in FIG. 1, the vapor delivery nozzle 42 of vapor delivery conduit 38 is positioned within the low pressure zone formed by the metering venturi means 44 of the carburetor means 40. A movable pintle 46 is situated within the vapor delivery nozzle 42 and is controlled by servomechanism means 48. Carburetor means 40 includes mixing section 47 which intercommunicates the metering venturi means 42 with the intake manifold 12. The operation and structure of carburetor means 40, fuel delivery nozzle means 42 and servomechanism 48 is described hereinbelow with reference to FIGS. 5 and 7.

Servomechanism 48 may be for example a conventional servomotor operated electrically or by electromechanical means. Servomechanism 48 receives an input command signal from servomechanism control means 50. As here illustrated, servomechanism control means 50 are arranged to be responsive to an exhaust gas sensor 52 which may be for example, a titania exhaust gas sensor according to U.S. Pat. No. 3,886,785. According to FIG. 1, fuel delivery and metering system 10 is also provided with temperature control means 54. Temperature control means 54 are arranged to be responsive to the vapor temperature in vapor delivery conduit 38 in order to control an exhaust gas flow diverter valve 56 which will be described in greater detail hereinbelow with reference to FIG. 9.

Figure 2:
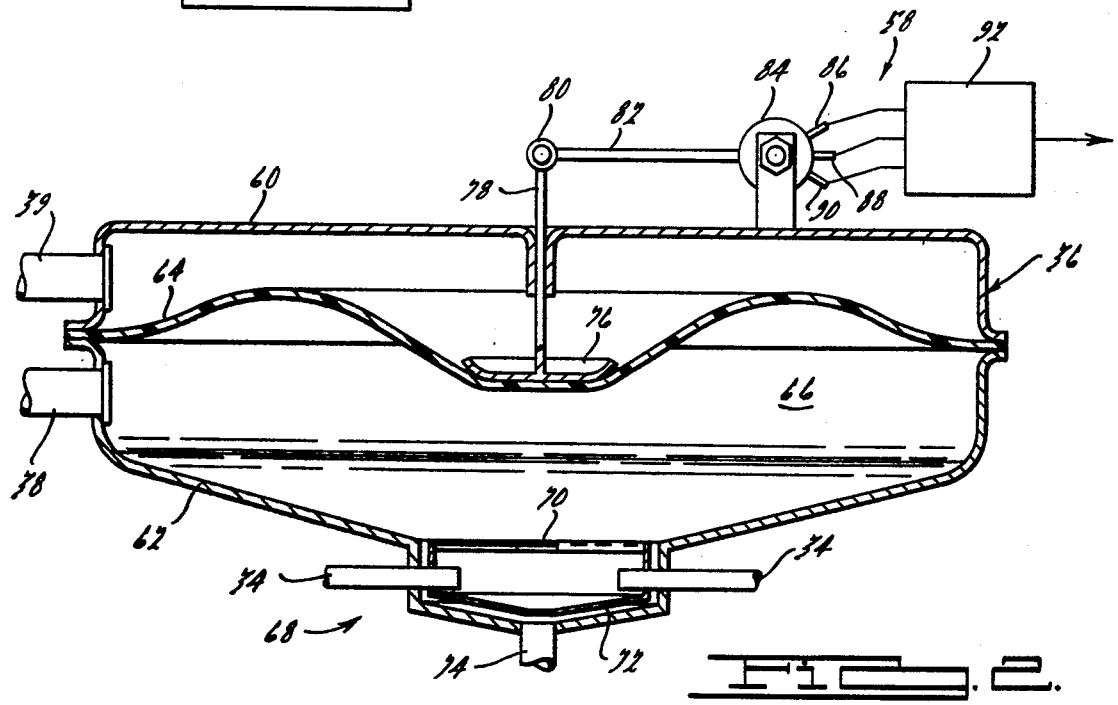
FIG. 2 illustrates the vapor reservoir and vapor volume control means according to the FIG. 1 embodiment in an enlarged, partly sectional, partly diagrammatic view.

Referring now to FIG. 2, the vapor reservoir 36 and its associated vapor pressure control means 58 are illustrated. Vapor reservoir 36 is comprised of a canister or housing having upper and lower housing sections 60, 62, respectively. A movable wall member 64 is sealingly confined between extending flanges of the upper and lower canister housing sections 60, 62 to define a vapor tight vapor space or storage zone 66. Movable wall means 64 may be formed as a diaphragm member and may be fabricated from any suitable, flexible, high temperature and vapor resistant material. Movable wall means 64 may be, for example, in the case of vaporized liquid gasoline, a polytetrafluoroethylene (PTFE) material. Other materials are known and can be used. PTFE material has a maximum operating temperature in the contemplated environment of about 600° F while commercially available gasoline may be expected to be completely vaporized at temperatures not exceeding 450° F. A suitable thickness for such a diaphragm member has been found to be 2 mils. Smaller thicknesses are also suitable, provided that manufacturing induced defects as perforations are avoided.

Lower canister housing section 62 is provided with a downwardly extending vapor inlet and condensate collection section 68. Vapor delivery conduits 34 are arranged to direct a vapor stream into the interior of section 68 where the vapor may communicate through swirl fins 70 with the vapor storage zone 66. A shield member 72 is received within section 68 and is attached to and supported by vapor inlet tubes 34. Condensate collection section 68 is provided with a generally downwardly extending generally conical and plate member having condensate collection conduit 74 affixed thereto at its lowest point. Shield member 72 is arranged to be spaced away from the walls of condensate collection section 68 and to be thermally floating with respect to the lower housing member 62 and the condensate collection section 68. Shield member 72 is arranged to provide a barrier between the relatively high temperature inlet vapor and the lower temperature condensate collection section 68 and any condensed fuel which may be accumulate therein. Preferably, shield member 72 is fabricated out of a low thermal inertia material such as a thin stainless steel or suitable ceramic. Swirl fins 70 promote intermixing of the higher temperature inlet vapor with any vapor residual within vapor zone 66 to encourage relatively uniform temperature distribution within zone 66. In operation, any vaporized fuel which would condense due to contact with a low temperature surface within the vapor reservoir 36, and particularly the less volatile fractions of gasoline, would be collected within section 68 and would flow through condensate return conduit 74 for return to the intermediate tank 20.

The central portion of movable wall means 64 is connected to plate member 76. Plate member 76 is connected to movable position sensing rod 78. Position sensing rod 78 is pivotally connected at pivot 80 to lever arm 82 of rheostat member 84. Rheostat member or potentiometer 84 is provided with three electrical terminals 86, 88 and 90 which communicate with the vapor volume control means 92.

Vapor region 66 communicates with the engine 14 through vapor conduit 38. Reference conduit 39 communicates the upper housing section 60 and particularly the nonvapor surface of movable wall means 64 with the source of air being utilized by internal combustion engine 14. In those instances where the air being ingested by engine 14 passes through an air cleaner, conduit 39 would preferably communicate with the interior of the air cleaner. In those instances where atmospheric air is provided directly to internal combustion engine 14, reference conduit 39 would communicate directly to the atmosphere. Reference conduit 39 thus provides the nonvapor side of movable wall portion 64 with a pressure reference which is substantially identically equal to the pressure of the air being provided to, and immediately upstream from, carburetor means 40.

Referring now to FIG. 3, the vapor volume control means 92 of FIG. 2 is illustrated as an electronic circuit. Vapor volume control means 92 is adapted to control valve 30 of coarse pumping and valving means 24 in response to the quantity of vapor within vapor region 66 as indicated by potentiometer 84. In the presently preferred embodiment of the vaporized liquid fuel system according to the present invention, coarse fuel metering valve 30 is a commercially available electrically controlled injection valve used, for example, in electronic fuel injection systems. Such valves are designed and intended to deliver a metered quantity of liquid fuel to the intake manifold of an internal combustion engine in proximity to an intake valve. It will be appreciated that a coarse fuel metering pump 28 could be similarly controlled. Vapor volume control circuit 92 includes a first circuit portion, contained within dashed line 94, for generating a saw tooth wave form for application to one input terminal 96 of a comparator 98. The other input terminal 100 of comparator 98 is arranged to receive a variable voltage signal from control circuitry 102. This variable level voltage signal is generated in response to potentiometer 84. Valve control circuitry 104 is responsive to the output signal from comparator 98 appearing at output terminal 106 to selectively energize the coarse fuel metering valve 30.

Saw tooth generator 94 includes a ramp generator portion 107 which is operative to generate a linearly increasing voltage across capacitor 108. Capacitor 108 is charged by current flow from the terminal 110 through resistor 112 and transistor 114. Transistor 114 is held in an "on" or conductive condition by the voltage divider comprised of a pair of resistances 116, 118, which may be, for example, of the same resistance value. Resistances 116, 118 are operative to apply a reduced voltage such is approximately one-half of the input voltage to the base terminal of transistor 114. Transistor 144 will be conductive and will charge capacitor 108 whenever the voltage on the base terminal exceeds the voltage on the collector terminal and is less than the voltage on the emitter terminal. The rate of change of capacitor 108 can be controlled by the magnitude of resistance 112.

Capacitor 108 intercommunicates the collector of transistor 114 to ground. The other or nonground side of capacitor 108 is communicated by conductor 120 to output terminal 122 of transistorized gate circuit 124. One input terminal of transistorized gate circuit 124 is provided with a constant voltage signal derived from a conventional voltage divider 126 through resistance 128. Voltage divider 126 is connected electrically between terminal 130 and the ground and is operative to provide a constant voltage signal at input terminal 132. For puroses of this circuit description, voltage terminal 110 may be considered to represent a first level of voltage and voltage terminal 130 may be considered to represent a second level of voltage with all similarly designated terminals being in electrical communication with the same voltage source. Transistor 114 is arranged to act as a constant current source in charging capacitor 108. The voltage across capacitor 108 will increase substantially linearly until a value is reached which would reverse bias the base-collector junction of transistor 108 causing the transistor to switch off.

Input terminal 134 of transistorized gate circuit 124 receives a periodically repeated voltage pulse signal, such as at 136, which is generated by oscillator circuit 138. Oscillator circuit 138 is electrically energized from a voltage terminal 110. Oscillator circuit 138 is operative to generate a voltage pulse which goes from substantially the ground level to substantially the value of the source voltage and has a very narrow pulse width. The occurrence at input terminal 134 of a pulse having a voltage value which is in excess of the voltage value of the generally constantly applied voltage appearing at terminal 132 will be operative to cause the output of transistorized gate circuit 124 to approach ground value. This will impose a substantially ground voltage on conductor 120 to thereby discharge capacitor 108. Removal of the pulse from input terminal 134 will allow capacitor 108 to recharge. Thus, a saw tooth voltage signal going from a near ground or zero value to a maximum or full value voltage will be applied to terminal 96 of comparator 98. The pulse width of the output signal generated at output terminal 106 by comparator 98 will then be a function of the voltage appearing on input terminal 100.

The oscillator circuit 138 includes unijunction transistor 140 and associated circuitry operative to generate a pulse train at circuit junction 142. The associated circuitry includes variable resistance 144 and capacitor 146 arranged in an RC network and operative to periodically charge and discharge the capacitor 146 to cause breakdown of the unijunction transistor 140. The pulses appearing at circuit junction 142 may be shaped by additional circuitry associated with transistors 148, 150 to establish the pulse train of pulses 136 having a generally uniform pulse width with rapid rise and fall. Resistance 144 is here shown to be variable in order to vary the frequency of the resulting pulse train. We have found that a pulse frequency of 50 Hz and a pulse width of 0.1 $\mu$sec. gives good results.

The potentiometer 84 is connected by its terminals 86, 90 between a voltage terminal, such as terminal 130, and ground. The slider 88 of potentiometer 84 is coupled to the movable wall member 64 of vapor reservoir 36 as described hereinabove with reference to FIG. 2. The voltage developed by potentiometer 84 at slider 88 is therefore a function of the position of the position of the movable wall member 64 and hence of the quantity of vapor within the vapor region 66. This voltage is applied to one input terminal 160 of comparator 162 to be compared with a reference voltage applied at input terminal 166. The reference voltage is developed by potentiometer 164. Comparator 162 is arranged to provide an output signal at output terminal 168 which signal represents the difference between the applied input signals. The output signal appearing at output terminal 168 is applied through potentiometer 170 to the input terminal 100 of comparator 98.

The input terminals 160, 166 of comparator 162 are provided with input resistances 174, 176 respectively. In addition, variable feedback resistance 178 and capacitor 180 are arranged electrically in parallel interconnecting input terminal 160 with output terminal 168. The ratio of the resistance of feedback resistance 178 compared with the resistance of input resistance 174 will establish the gain of the comparator and the gain so established can be expected to be stable in extending use. Capacitor 180 is selected to prevent relatively high frequency variations in the voltage appearing at output terminal 168. This is desirable to prevent a relatively high frequency instability in the closed loop which includes the "mechanical" elements of the primary heater means 26 and the vapor reservoir 36. For good d.c. stability, the values of resistance of the input resistances 174, 176 are selected to be substantially equal. The value of the grounding resistance 182 is also selected to be approximately equal to the value of the feedback resistance 178 for good d.c. stability.

With potentiometer 84 disconnected, potentiometer 164 is adjusted to make the voltage at output terminal 168 sufficiently high to just provide maximum fuel delivery to the primary heater means 26. Potentiometer 84 is then connected and adjusted so that the voltage at output terminal 168 is as previously set. Feedback resistance 178 is then adjusted to give a zero output voltage at output terminal 168, corresponding to the vapor reservoir being filled, by holding the vapor reservoir movable wall portion in an up or "filled" condition. As illustrated in FIG. 2, a depleted vapor supply in reservoir 36 will cause the voltage appearing at input terminal 160 to decrease. The voltage appearing at output terminal 168 is arranged to increase as the voltage at input terminal 160 decreases from the reference level established by potentiometer 164.

Potentiometer 170 is connected between output terminal 168 and ground. The slider 172 of potentiometer 170 is connected to the input terminal 100 of comparator 98. The slider 172 may also be connected to the apparatus controlling the position of the throttle valve within throttle valve body 17. For example, a closed throttle condition would cause the slider to reduce the level of the voltage signal applied to input terminal 100. This arrangement will operate to vary the effective gain of comparator 162 in response to actual operation of internal combustion engine 14 to assist in filling the vapor reservoir when the throttle valve of the engine is opened and to assist in preventing excess vapor formation when the throttle valve is moved toward a closed position. Potentiometer 170 will also assist in preventing relatively low frequency instability in the loop which includes primary heater means 26 and vapor reservoir 36.

Comparator 98 is arranged to generate an output voltage signal at output terminal 106 whenever the voltage appearing on input terminal 96 is below the level of voltage established at the input terminal 100. Thus, with a saw tooth input signal at input terminal 96, a pulse train of rectangular pulses will be generated at output terminal 106 with a frequency equal to the frequency of the saw tooth wave train and a pulse width determined by the portion of any particular saw tooth pulse which is below the threshold voltage. The output signal will be applied to output transistor 184 which will invert the signal to apply an input to the power amplifier circuitry 186 to control energization of the coarse fuel metering valve 30. Thus, when vapor reservoir 36 is full, the threshold signal will be substantially zero and the output signal at terminal 106 will be substantially constant at the zero level. This will turn output transistor 184 "off" thereby applying a high voltage signal to power amplifier 186 causing power amplifier 186 to be "off". This will result in closing coarse fuel metering valve 30 and terminating fuel delivery to the primary heating means 26. As the vapor is depleted from vapor reservoir 36, the threshold signal will rise causing the output signal to appear as a train of pulses at the saw tooth frequency. The pulse portion of the output signal pulse train will switch output transistor 184 "on" and will cause the power amplifier 186 to be "on" to energize coarse fuel metering valve 30. With valve 30 on or open, additional quantities of fuel will be allowed to flow to the primary heater means 26 for vaporization thereby. For very low volumes of vapor in vapor reservoir 36, the threshold signal will be high and the pulse width will increase thereby increasing the "on" time of power amplifier 186 and the open time of coarse fuel metering valve 30.

Referring now to FIG. 4, an alternative vapor reservoir 200 is shown. Vapor reservoir 200 includes a collapsible envelope comprised of the thin membrane of plastic material 202 which is sealingly attached to base plate member 204. Base plate member 204 may be provided with an inlet source 206 of vaporized liquid fuel and a vapor conduit 208 for communicating the interior of the reservoir 200 with the internal combustion engine, now shown. Vapor conduit 208 is shown as having its inlet orifice arranged in the central portion of envelope 202. The inlet orifice of inlet 206 is preferably downwardly directed to promote thermal mixing. Base plate 204 is provided with a condensate collection depression 210 which communicates with condensate return conduits 212. In order to drain condensate from the vapor conduit 208, the condensate return conduit 212 also communicates with vapor conduit 208.

Referring now to FIG. 5, the venturi metering section carburetor means 40 is shown in an illustrative, partly sectional, view. Carburetor means 40 is provided with means defining a substantially conventional metering venturi 44. Vapor conduit 38 is provided with vapor delivery nozzle 42 which is situated within the metering venturi 44 of the carburetor means 40. Vapor conduit 38 is arranged to place the orifice of vapor delivery nozzle 42 within the low pressure region established by the metering venturi 44. In this embodiment, metering venturi 44 is arranged to define an air flow passage which is rapidly convergent on its upstream side and gradually divergent on its downstream side. The terms "upstream" and "downstream" relate to the direction of intake air flow which is illustrated by arrow A. Swirl inducing mixing means 214 is situated downstream from venturi 44. Swirl inducing mixing means 214 is described more fully hereinbelow with reference to FIG. 6. A mixing region 215 is disposed downstream from swirl inducing means 214.

As a coarse measure of air/fuel ratio control, the ratio of the area of the venturi 44 in the plane of the orifice of vapor delivery nozzle 42 when compared to the area of the orifice of the vapor delivery nozzle 42 should be slightly less than that which would produce the desired air/fuel ratio. We have determined that the air/fuel ratio is approximately equal to (0.7) of the ratio of the air delivery area compared to fuel delivery area. This relationship is an approximation and is based on air at 70° F and commercially available gasoline, as the fuel, vaporized at 400° F. As will be explained hereinbelow, by modulating the actual area of fuel delivery through use of a movable pintle and needle valve, for example, the actual air/fuel ratio may be modulated and a desired air/fuel ratio may be precisely attained. In view of the fact that fuel vapor is provided to the moving air stream with substantially the same pressure differential through the orifice of vapor delivery nozzle 42 as is experienced by the air stream in flowing from the upstream side of metering venturi 44 to the plane of the orifice of nozzle 42 and is delivered to the low pressure region defined by the air stream moving through metering venturi 44, the mass of vaporized liquid fuel can be precisely controlled to match the mass of air being consumed by the associated engine to maintain a preselected and desired air/fuel ratio for all mass ratios of air flow.

Referring now to FIGS. 5 and 6, the swirl inducing means 124 are illustrated in a perspective view. Air swirl inducing means 214 are comprised of a substantially annular insert member having a solid rim portion 216 and a plurality of upstanding fin members 218. Fin members 218 are connected at their radially inwardmost point by a further substantially annular rim 220 which is arranged to define an annular aperture 222 at the central portion of swirl inducing means 214. Aperture 222 is sized and positioned with respect to vapor delivery nozzle 42 to permit the unhindered passage of a vapor stream from vapor delivery nozzle 42 through the air swirl inducing means 214 without contact of the vapor stream with swirl inducing means 214. Fin members 218 are cooperative to induce a swirling movement of the air stream as it passes over the fin members 218 into mixing section 215. This swirl is operative to promote intermixing of the vapor stream from vapor delivery nozzle 42 with the air passing through the mixing section 215. Further, and more importantly, the swirl is operative to prevent the vapor stream from coming into contact with the side walls of mixing section 47 to thereby further reduce any opportunity for contact of the vaporized liquid fuel with a cool metal surface and resultant condensation.

Mixing section 47 is disposed below, or downstream from, swirl inducing means 214. With reference to FIGS. 1 and 5, mixing section 47 is shown to be vertically disposed between carburetor means 40 and throttle body 17 and is operative to provide an unobstructed mixture flow conduit therebetween. It will be appreciated that the vertical orientation of mixing section 47 is arbitrary and for purposes of illustration. Mixing section 47 in an automotive installation could be disposed horizontally across the top of engine 14.

The "raw" vaporized fuel will have a dew point dependent upon the various fractions which make up the vapor. However, the fuel vapor per se can begin to condense as its temperature drops below the temperature of complete vaporization, for example 425° F. However, the dew point of an air/fuel mixture having a vaporized liquid fuel such as gasoline is approximately 125° F, again depending upon the fuel fractions present in the fuel vapor, at atmospheric pressure. As the pressure drops to subatmospheric levels, the dew point of the fuel vapor will be further lowered. Thus, once the fuel vapor has been mixed with air, the dew point of the fuel vapor will drop dramatically. The condensation problem is lessened and contact with engine components will not have an adverse effect on the vapor form of the fuel. Additionally, the high vapor inlet temperatures and the short residence time of the vapor in the region downstream from vapor delivery nozzle 42 will virtually preclude any opportunity for condensation to occur.

Referring now to FIG. 7, vapor delivery conduit 38 is shown in a section view which includes movable pintle 46. For convenience, carburetor means 40 is also shown in a sectional view. Throttle body 17 including substantially conventional plate valve 223 is also shown. However, mixing section 215 has been omitted from this view for convenience. As illustrated in this view, the movable pintle 46 is provided with a needle valve portion or member 224 which is positioned to intrude into the orifice of the vapor delivery nozzle 42. Pintle 46 is arranged for bidirectional movement in the direction of arrow B. It can thus be seen that the precise area of the orifice of fuel delivery nozzle 42 may be varied by the movement of metering needle 224 in order to vary the area of the fuel delivery nozzle and hence the quantity of vaporized liquid fuel being provided to the engine through vapor delivery conduit 38. Throttle valve 223 is operative to vary the rate of delivery of the combustible air/fuel mixture to the intake manifold of engine 14 from the carburetor means 40. Throttle valve 223 may be operated in the conventional manner. As discussed hereinabove, throttle valve 223 will not cause or promote any substantial amounts of vaporized fuel condensation since it will be positioned below the mixing section 215 and hence sufficiently downstream from vapor delivery nozzle 42 to be in the mixture where the dew point of the vaporized fuel has been lowered. Additionally, throttle valve 223 will itself normally be at a relatively elevated temperature due to its proximity to the heated components of the engine 14.

Vapor delivery nozzle 42 is here shown as including auxiliary heating means 225 in the form of an electrical heater coil enclosed within a shield means. The shield means may be, for example, a ceramic insulator. The auxiliary heating means 225 is operative to maintain the temperature of vapor delivery nozzle 42 elevated sufficiently against the heat dissipating effects of the flow of unheated intake air over the surface of nozzle 42 to prevent condensation of the fuel vapor passing therethrough. Preferably, the orifice of vapor delivery nozzle will be placed within the region defined by metering venturi 44 at or within the zone of maximum depression (minimum pressure) in order to provide the greatest pressure differential across the orifice. However, accurate placement within the low pressure zone is not critical since the vapor pressure is referenced to substantially the same pressure as exists upstream from the metering venturi 44 and the size of the minimum pressure zone defined in the direction of flow (arrow A) is variable.

Referring now to FIG. 8, the presently preferred auxiliary heating means 32 according to FIG. 1 is illustrated in a partly diagrammatic, partly schematic, view. In order to provide a large surface-to-volume ratio consonant with rapid heating, auxiliary heating means 32 comprise a plurality of electrically conductive heater tubes 226 each of which is arranged to receive a flow of fuel in the direction of arrow C. Conductive tubes 226 are fabricated preferably from thin walled stainless steel tubing. For example, bundle of five thin walled stainless steel tubing sections approximately (15) inches in length and having a 0.07 inch outer diameter have been found to be satisfactory. Tube members 226 are encased within a ceramic sheath or housing member 228. In order to assure uniform heating, tubes 226 may be welded together.

A first terminal member 230 is connected to one end, for example the upstream end, of the bundle of tubing sections 226 and a second terminal member 232 is connected to the opposite, or downstream, end of the tubing sections 226. Electrical terminal 230 is communicated to solenoid switch means 234 which includes switch member 236. Second electrical terminal 232 is communicated to one terminal of a source of electrical energy such as, for example battery 238. Solenoid switch member 236 is a normally open electrical switch and may be closed upon energization of the solenoid member 235. Solenoid switch means 234 is communicated to the other terminal of battery 238 by conductor 240 and is also communicated to switch 242 by a second conductor 244. A third electrical terminal member 246 is attached to the ceramic housing member 228 and is communicated to switch 242. An overtemperature switch means 248 is connected electrically between terminals 232 and 246. Overtemperature switch means 248 includes a pair of contact discs or members 250, 252 which, under normal temperature conditions, will be in abutting electrical contactive engagement. Contact disc 250 is axially displacably mounted to terminal member 246 by resilient means in the form of spring member 254.

In operation, closure of switch 242 will establish an electrical circuit from battery 238, solenoid member 235, terminal member 246, overtemperature switch means 248, terminal member 232, back to the battery 238. Establishment of this completed circuit will actuate solenoid switch means 234 to close switch 236 thereby causing an electrical voltage to appear between terminal members 230 ad 232. This will cause an electrical current to flow through the fuel flow tubes 226 which current will be operative to elevate the temperature of the tubes 226. Switch 242 may be, for example, the ignition switch of an internal combustion engine electrical system. Alternatively, switch 242 may be a separately actuated switch which would be actuated slightly in advance of engine start-up. Using five thin walled stainless steel tubes, as hereinabove described, for the fuel flow tubes 226 and using the conventional twelve volt battery normally provided with automotive vehicles, we have found that the auxiliary heater 32 would convert approximately 2000 watts of electrical energy to heating energy. At a 70° F ambient temperature, this magnitude of heating energy would be operative to sufficiently charge the vapor reservoir 36 to provide start-up vaporized liquid fuel within about (10) seconds. It will be appreciated that suxiliary heater means 32 may be arranged for serial or parallel fluid flow with the primary heater means 26. By suitable valving, auxiliary heater means 32 could be switched from parallel flow to serial flow and could also be placed in a combined parallel serial flow relation with primary heater means 26.

Overtemperature switch means 248 is operative to limit the maximum temperature to which fuel flow tubes 226 may be elevated. By fixedly sttaching one end, in the illustrated embodiment the upstream end, of the tubes 226 to a nonheated structural member or vehicle body part and by fixedly attaching ceramic housing member 228 to the fuel flow tubes in close association with terminal 230, the opposite or downstream end of fuel tubes 226 may be allowed to move axially with respect to the mounting and housing member 228. The application of heat energy will cause fuel flow tubes 226 to undergo an axial expansion which will cause rightward movement, relative to FIG. 8, of contact disc 252 with respect to contact disc 250. When rightward movement has reached a predetermined value, which may be selected to be representative of a temperature sufficiently high to completely vaporize the liquid fuel passing through tubes 226, spring member 254 will reach its limit of rightward travel and the contact members 250, 252 will separate. This separation of the contact discs 250, 252 will terminate the circuit which includes solenoid member 235. This will cause switch member 236 to open thereby discontinuing the flow of electric energy through heating tubes 226.

In one variation of the electric auxiliary vaporizer according to FIG. 8, switch 242 may include a time delay mechanism so that switch 242 may be in a closed or current flow condition for a predetermined period of time. This time period could be, for example, pre-calculated to be sufficiently long to assure that engine start-up and operation has provided a supply of heated exhaust gas to the primary heater means 26 according to FIG. 1, to assure continuous supply of vaporized liquid fuel to the vapor reservoir 36. Alternatively, switch 242 could be re-opened in response to a temperature sensor indication of sufficient heat availability in the primary heater means 26 to supply vaporized liquid fuel to the vapor reservoir 36 and the engine 14. In another embodiment, heating tubes 226 could be arranged in a helical pattern to conserve space and reduce heating time. It would also be possible to provide a logic circuit, responsive to a variety of inputs, for controlling switch 242.

Referring now to FIG. 9, the presently preferred primary liquid fuel heater means 26 is illustrated in a partly schematic, partly sectional, partly diagrammatic view. Primary heater means 26 comprise a helical coil 260 of fuel conduit which is disposed within heating chamber 262 of a bi-chambered housing 264 formed as a portion of exhaust gas conduit 16. In order to achieve a high surface-to-volume ratio for heat exchanger coil or helix 260, consonant with rapid liquid vaporization, a plurality of fuel conduits 260a, 260b, and 260c are utilized in fabricating heat exchanger coil or heliz 260. The individual conduits 260a, 260b and 260c are wound in side-by-side alignment and may be welded together to equalize the temperature gradients between individual coils. Housing portion 264 is provided with a generally centrally disposed baffle to define an exhaust gas flow chamber 266 which is separated from the heat exchanger chamber 262.

The flow of exhaust gases, in the direction of arrow D, through heat exchanger chamber 262 within exchanger housing 264 may be controlled by exhaust gas flow diverter valve 56. As illustrated in FIG. 9, exhaust gas flow diverter valve 56 is pivotally connected as at 270 to the central baffle 268 and is positioned in response to the vapor temperature responsive valve control means 54. Temperature responsive valve control means 54 include vacuum motor 272, vacuum valve 280 and temperature control circuit means 281.

Exhaust gas flow diverter valve 56 is mechanically coupled to vacuum motor 272. Vacuum motor 272 is operative to pivotally rotate diverter valve 56 between the positions denoted by stops 274 and 276 on the side wall of housing 264. Vacuum motor 272 is communicated by vacuum hose 278 to vacuum valve 280. Vacuum valve 280 communicates with an engine source of vacuum through vacuum conduit 282. Vacuum valve 280 may be, for example, a solenoid operated valve to selective communicate vacuum motor 272 with a vacuum source in response to electrical signals applied by circuit means 281. Vacuum valve 280 is responsive to temperature responsive control means 281 to command vacuum motor 272 to actuate exhaust valve 56. By actuating exhaust flow control valve 56 to a position in substantial abutment with stop 276, the flow of exhaust gas will be diverted from passage over heat exchanger coil 260 to flow through chamber 266. With respect to FIGS. 1 and 9, temperature responsive control means 281 may be arranged to be responsive to thermistor 57 which may be located, for example, within vapor conduit 38. Alternatively, thermistor 57 could be in thermal exchange contact with the vapor within vapor reservoir 66 or with any other convenient structural member having a temperature which is indicative of the vapor temperature within the vapor delivery portion of the vaporized fule delivery and metering system 10.

By way of example, temperature responsive circuit means 281 may include an electrical bridge circuit which includes, as a portion thereof, the thermistor 57 ad an electronic comparator circuit to establish the minimum desired vapor temperature. As thus described, vacuum motor 272 and exhaust diverter valve 56 may be cooperative to cause substantially all of the exhaust gas flow to pass through heat exchanger coil 260 or through by-passchamber 266. With the diverter valve 56 in an intermediate position, a portion of the exhaust flow may pass through each chamber. Since placement of the diverter valve 56 in the extreme positions could ordinarily be expected to result in substantial temperature variation of the vapor being provided to vapor reservoir 66, the thermal inertia of the heat exchanger coil 260, the central baffle 268 and the thermal coupling between the two chambers of the housing may be selected to give adequate temperature smoothing comensurate with acceptable warm-up and good transient response times.

It will therefore be seen that the present invention readily accomplishes its stated objectives. A fuel metering and delivery system is disclosed which may receive liquid fuel from a liquid fuel reservoir and which will provide a vaporized liquid fuel stream for mixture with an oxygen bearing gas, such as air, to develop a combustible air/fuel mixture for consumption by an internal combustion engine. The system according to the present invention may be rendered operative from engine start-up at ambient temperature to full operating temperature and includes means for maintaining the air/fuel ratio of the combustion mixture substantially constant for all engine operating conditions and over long periods of time.

By retaining the generated vapor under substantially atmospheric pressure and by delivering fuel vapor to a low pressure point within a metering venturi, the air-to-fuel ratio of the combustible mixture may be readily controlled by the ratio the oxygen bearing gas delivery area to the vapor delivery area in the metering venturi.

An intermediate holding tank or reservoir communicating with the vapor reservoir is provided to allow less volatile fractions of the liquid fuel to be collected and revaporized under high heat and vapor utilization conditions to thereby avoid the accumulation of the less volatile fractions under conditions where these less volatile fuel fractions would not be utilized.

By utilizing an air swirl inducing device downstream from the metering venturi and by further arranging this device to be nonconductive with respect to the entering vapor stream, good mixing of the air/fuel mixture may be achieved while concommitantly constraining the fuel vapor to the central region of the swirl thereby avoiding contact between the vapor stream and any cool surface which would tend to cause condensation of the vaporized fuel.

An electrical auxiliary heater apparatus is provided for accomplishing rapid vaporization of quantities of liquid fuel sufficient to initiate engine operation whereby the engine may be started with a vaporized liquid fuel. The more volatile "light ends" or fractions of the liquid fuel will be provided to vapor reservoir 36 to facilitate engine start-up. This avoids or substantially reduces many of the emissions causing difficulties during the start-up cycle of the engine which is important in terms of meeting governmental internal combustion engine emission standards.

We claim:

1. A fuel delivery and metering system for use in conjunction with an internal combustion engine having a source of fuel, which fuel is a liquid under standard temperature and pressure conditions, comprising in combination:

coarse liquid fuel delivery means communicating with the source of liquid fuel;

heating means in fluid communication with said delivery means operative to substantially completely vaporize liquid fuel delivered to said heating means by said delivery means;

vapor reservoir means spaced apart from, and in fluid communication with, said heating means operative to define a variable volume vapor storage space for receipt of said storage of vapor generated by said heating means, further operative to maintain the vapor stored therein at substantially atmospheric pressure;

means responsive to the volume of vapor within the vapor storage space operative to control said delivery means whereby the generation and supply of vaporized liquid fuel may be controlled to maintain a predetermined volume of vapor within the vapor storage space;

carburetor means in fluid communication with said vapor reservoir means operative to receive vaporized liquid fuel from said vapor storage and further operative to mix the fuel vapor with air to establish a combustible air/fuel mixture; and means cooperative with said vapor reservoir means for maintaining the air/fuel ratio of the combustible mixture established by said carburetor means substantially constant for variations in the rate of establishment of the combustible mixture.

2. The system according to claim 1 wherein said means for maintaining a substantially constant air/fuel ratio comprise:

metering venturi means having an inlet side and an outlet side within said carburetor means for communicating, on the inlet side, with a source of air and for communicating, on the outlet side, with the engine;

said metering venturi means operative to generate a low pressure zone signal indicative of the rate of air flow therethrough;

vapor delivery nozzle means having an orifice disposed in the low pressure zone; and means for communicating the air pressure immediately upstream from the metering venturi means to the vapor reservoir means operative to maintain the vapor pressure immediately upstream from the vapor delivery nozzle orifice substantially equal to the air pressure immediately upstream from the metering venturi means.

3. The system according to claim 1 wherein said heating means comprise:

primary heating means responsive to the temperature of the internal combustion engine exhaust gas for vaporizing liquid fuel.

4. The system according to claim 1 wherein said heating means comprise:

auxiliary heating means responsive to the application of electric energy for vaporizing liquid fuel.

5. The system according to claim 4 wherein said heating means include:

primary heating means responsive to the temperature of the internal combustion engine exhaust gas for vaporizing liquid fuel.

6. A system for delivering and metering fuel, in vapor form, which is a liquid at standard temperature and pressure for mixture with air to establish a combustible air/fuel mixture for delivery to an internal combustion engine, comprising in combination:

liquid fuel delivery means in fluid communication with the source of liquid fuel;

heating means in fluid communication with said delivery means operative to substantially completely vaporize liquid fuel provided by said delivery means to said heating means;

vapor storage means spaced apart from said heating means and having a variable volume vapor storage space in fluid communication with said heating means operative to maintain a volume of vaporized liquid fuel at a defined, substantially atmospheric, vapor pressure;

carburetor means including a vapor delivery nozzle in fluid communication with the interior of the vapor storage space;

said carburetor means arranged for communicating the combustion chambers of an associated engine with a source of air and for intermixing vaporized liquid fuel from said vapor storage space with air for delivery, as a combustible air/fuel mixture, to the combustion chambers;

metering venturi means within said carburetor means operative to establish a low pressure zone, said low pressure zone having a pressure indicative of the rate of air flow into the engine;

said vapor delivery nozzle being arranged to have its orifice within said low pressure zone; and means responsive to the air pressure immediately upstream from said metering venturi means operative to define and controllably regulate the quantity of vapor (pressure) flow from said delivery nozzle.

7. The system according to claim 6 including vapor temperature control means responsive to the vapor temperature at a selected vapor location upstream from said vapor delivery nozzle operative to control the temperature of at least a portion of said heating means.

8. The system according to claim 6 including intermediate liquid fuel reservoir means in fluid communication with the source of liquid fuel and said liquid fuel delivery means and said vapor storage means include:

condensed vapor collection means communicating with said intermediate liquid reservoir operative to return condensed vapor to said intermediate reservoir whereby condensate may be relatively rapidly reintroduced to the heating means for revaporization.

9. The system according to claim 6 including:

sensing means responsive to the volume of vapor within said vapor storage means operative to generate a control signal for application to the liquid fuel delivery means for regulating the rate of liquid fuel delivery to the heating means whereby the rate of liquid fuel vaporization may be controllably modulated.

10. The system according to claim 7 wherein said heating means comprise:

primary heating means responsive to the temperature of the internal combustion engine exhaust gas for vaporizing liquid fuel.

11. The system according to claim 7 wherein said heating means comprise:

auxiliary heating means responsive to the application of electric energy for vaporizing liquid fuel.

12. The system according to claim 11 wherein said heating means include:

primary heating means responsive to the temperature of the internal combustion engine exhaust gas for vaporizing liquid fuel.

* * * * *